United States Patent [19]
McEwan

[11] Patent Number: 5,465,094
[45] Date of Patent: Nov. 7, 1995

[54] TWO TERMINAL MICROPOWER RADAR SENSOR

[75] Inventor: Thomas E. McEwan, Livermore, Calif.

[73] Assignee: The Regents of the University of California, Oakland, Calif.

[21] Appl. No.: 182,335

[22] Filed: Jan. 14, 1994

[51] Int. Cl.⁶ .................................................. G01S 13/04
[52] U.S. Cl. .................................................. 342/28; 342/21
[58] Field of Search .................................. 342/28, 21

[56] References Cited

U.S. PATENT DOCUMENTS 4,360,905  11/1982  Hackett .................................. 367/94
5,287,111  2/1994  Shpater .................................. 342/28

Primary Examiner—Mark Hellner
Attorney, Agent, or Firm—Henry P. Sartorio

[57] ABSTRACT

A simple, low power ultra-wideband radar motion sensor/switch configuration connects a power source and load to ground. The switch is connected to and controlled by the signal output of a radar motion sensor. The power input of the motion sensor is connected to the load through a diode which conducts power to the motion sensor when the switch is open. A storage capacitor or rechargeable battery is connected to the power input of the motion sensor. The storage capacitor or battery is charged when the switch is open and powers the motion sensor when the switch is closed. The motion sensor and switch are connected between the same two terminals between the source/load and ground.

20 Claims, 2 Drawing Sheets

TWO TERMINAL MICROPOWER RADAR SENSOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

The invention relates to ultra-wideband (UWB) radar motion sensors and more particularly to the power and wiring configuration thereof.

Many sensors function as simple switches that require no external power. Such sensors are considered passive since they do not dissipate power. An example of a passive sensor is a bimetallic thermostat that closes a switch contact at a particular temperature.

Other sensors are active devices which consume power from an external source. Electrical connections are therefore required. An example of an active sensor is an electronic thermostat whereby the switch is relay driven by a circuit that requires external power.

Passive switches are most desirable since no external power is required, thereby simplifying wiring to the sensor.

A motion sensor based on ultra-wideband (UWB) radar is described in U.S. patent application Ser. No. 08/044,717, now U.S. Pat. No. 5,361,070. UWB radar range is determined by a pulse-echo interval. For motion detection the sensors operate by staring at a fixed range and then sensing any change in the averaged radar reflectivity at that range. The sensors have a wide variety of applications including security systems; switches for lights, doors, appliances, machines, etc.; medical devices; and automotive collision sensors.

In all applications of the impulse radar motion sensor, it is desirable to employ a low power configuration having a simple wiring scheme. Ideally, only a single wire pair from a power source is required.

SUMMARY OF THE INVENTION

Accordingly it is an object of the invention to provide an ultra-wideband radar motion sensor with a low power configuration.

It is also an object of the invention to provide an impulse radar motion sensor configuration which requires only a single wire pair for connection to an external power source.

The invention is a micropower ultra-wideband (UWB) radar motion sensor with associated switch which appears to be passive, with a normally open single pole single throw (SPST) switch configuration. The sensor is a micropower ultra-wideband radar motion sensor and the switch is a MOSFET transistor or other type switch. The power supply can be DC or AC. For AC power an optically controlled thyristor can be used as the switch. The switch is in series with the power supply and the load. The load is a warning device such as a light or buzzer. The output of the radar motion sensor controls the operation of the switch.

The power circuitry includes a capacitor or rechargeable battery connected to the power input of the radar motion sensor and a diode connected from the power supply and series load to the power input of the motion sensor. When the switch is open, the power supply powers the motion sensor and charges the capacitor or battery. When the switch is closed, the power supply actuates the load, and the capacitor or battery power the motion sensor. The micropower radar sensor draws so little current that for all practical purposes it may be considered an open circuit relative to the current that flows when the switch is closed. Only a single wire pair is routed to the radar motion sensor, considerably simplifying wiring. Further, multiple sensors may be tied in parallel for a simplified "alarm on detect" from any of the sensors.

DETAILED DESCRIPTION OF THE INVENTION

Figure 1:
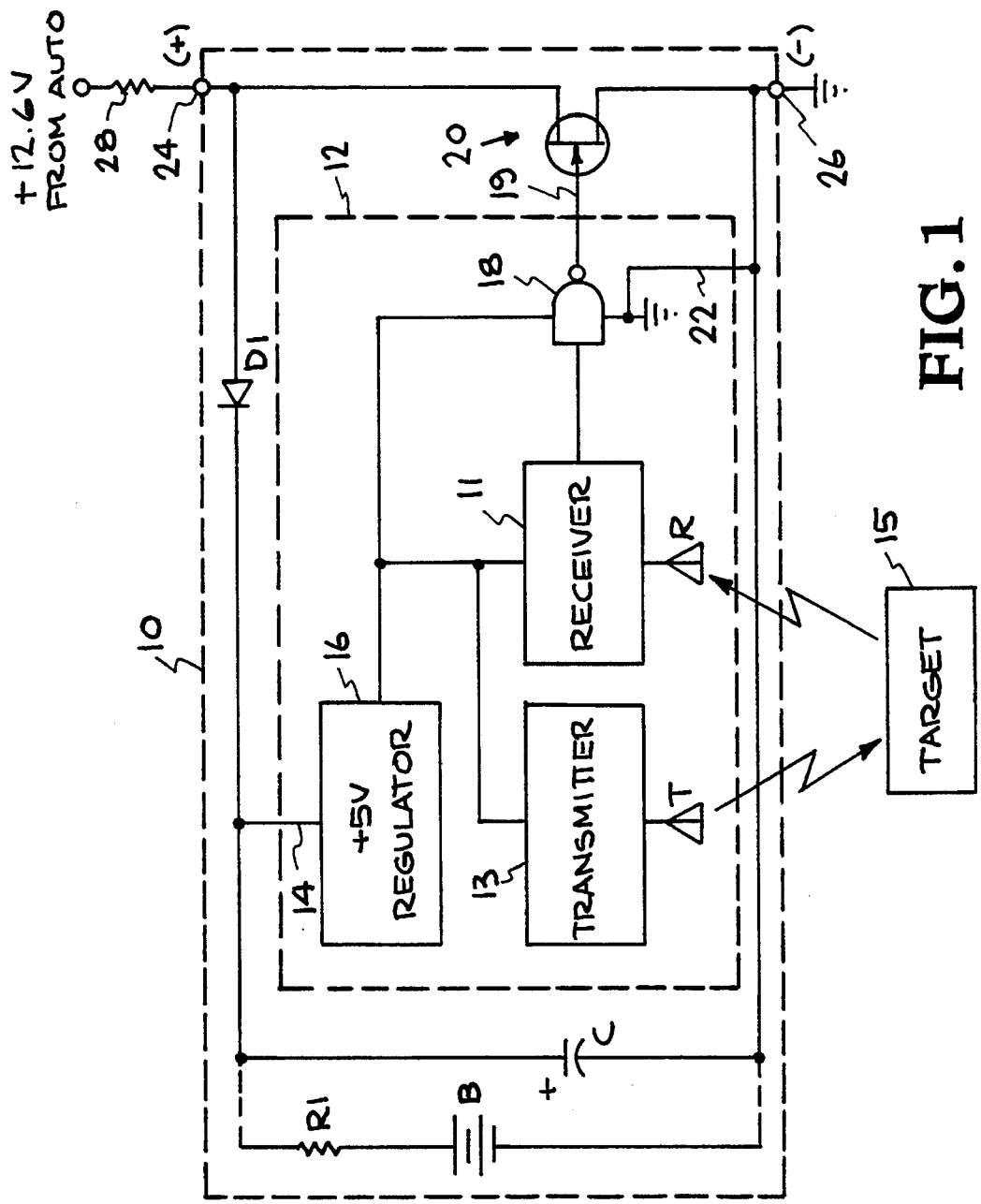
FIG. 1 is a schematic diagram of a two terminal micropower radar sensor with a DC power supply.

Referring to FIG. 1, a two terminal micropower radar sensor/switch apparatus 10 is formed with a micropower ultra-wideband (UWB) radar motion sensor 12. The micropower radar motion sensor 12 is described in U.S. patent application Ser. No. 08/044,717, now U.S. Pat. No. 5,361,070, which is herein incorporated by reference. The sensor 12 includes a receiver 11 which is described in U.S. patent application Ser. No. 08/044,745, now U.S. Pat. No. 5,345,4471, which is herein incorporated by reference.

Power input 14 to sensor 12 is connected to a (+5 V) voltage regulator 16 within sensor 12. Sensor 12 includes a transmitter 13 which radiates a series of pulses from transmit antenna T to a target 15 and receives reflected pulses at receive antenna R which is connected to receiver 11. Receiver 11 is gated relative to transmitter 13 to provide a selected range to target 15.

The output of sensor 12 can be represented by CMOS logic gate 18 since there is an output from receiver 11 when motion is detected at the selected range and no output when no motion is detected. The output of CMOS gate 18 is connected by signal output line 19 to the gate G of a power MOSFET (M) 20, such as an IRF 110. MOSFET 20 is connected across two terminals 24, 26; terminal 24 is connected to drain D of M and to a DC power source, e.g. +12.6 V, through a load 28 while terminal 26 is connected to source S of M and to ground. The MOSFET 20 functions as a switch that is normally not conducting until the CMOS gate 18 output swings from 0.0 V to +5.0 V when motion is detected. When the G-S voltage of MOSFET 20 exceeds about 3 V, the D-S terminals assume an "on" state exhibiting less than 1.0 ohms resistance, thereby throwing the SPST switch from "open" to "closed". When the switch is closed, current flows through the load.

A network formed by diode D1 and capacitor C, or alternatively battery B and limiting resistor R1, provide power to the radar sensor 12 during time that MOSFET 20 is conducting. Diode D1 has its anode connected to terminal 24 and its cathode connected to radar sensor power input 14. Capacitor C is connected from radar sensor power input 14 to terminal 26. Ground lead 22 of radar sensor 12 is also connected to terminal 26. Alternatively rechargeable battery B and series limiting resistor R1 can replace capacitor C.

D1 and C prevent loss of power to the sensor 12 whenever MOSFET 20 conducts, since the voltage across the terminals 24, 26 designated "+" and "−" is nominally +12.6 V from an automotive power system, and this voltage is reduced to ~0.0 V when MOSFET 20 conducts. Capacitor C can be replaced by a rechargeable battery B, e.g. a nickel cadmium battery, along with a series limiting resistor R1, which functions similarly. Either C or B is an energy storage means which provide micropower to UWB sensor 10 when the switch is on and is recharged when the switch is off.

The current drawn by the sensor 12 is less than 0.1 mA and thus causes negligible drop across the load 28, which may typically have about 10 ohms resistance. Power to the sensor is supplied through a warning light or buzzer that provides the load for the radar switch. Thus when the switch (MOSFET) 20 is on, the warning light or buzzer is actuated.

When MOSFET 20 conducts, storage capacitor C (or battery B) retains its voltage since diode D1 cuts off. If the voltage across C is +12 V and the regulator 16 in the sensor 12 requires >+5 V, C may discharge $\Delta V=7$ V before the sensor 12 malfunctions. Using a commercially available high density computer memory power backup capacitor with C=0.1 Farad, it will take C approximately $\Delta T = C \Delta V / I = 7000$ sec or ~2 hours to discharge from +12 to +5 volts, for a sensor current of I=0.1 mA. Thus, the sensor may detect continuous motion and hold the switch closed for ~2 hours. In typical applications, however, motion occurs for only a short period of time (<1 min). Whenever MOSFET 20 becomes nonconductive, C (or B) is nearly instantaneously recharged through D1, resetting the 2 hour capability.

MOSFET 20 is the preferred switching device for the radar motion sensor 12 for DC power. However, other switching devices, e.g. a Darlington connected bipolar transistor pair or a silicon controlled rectifier (SCR) are also suitable. The switch is connected in series with the power supply and load, with its control lead connected to the output of the radar sensor.

Figure 2:
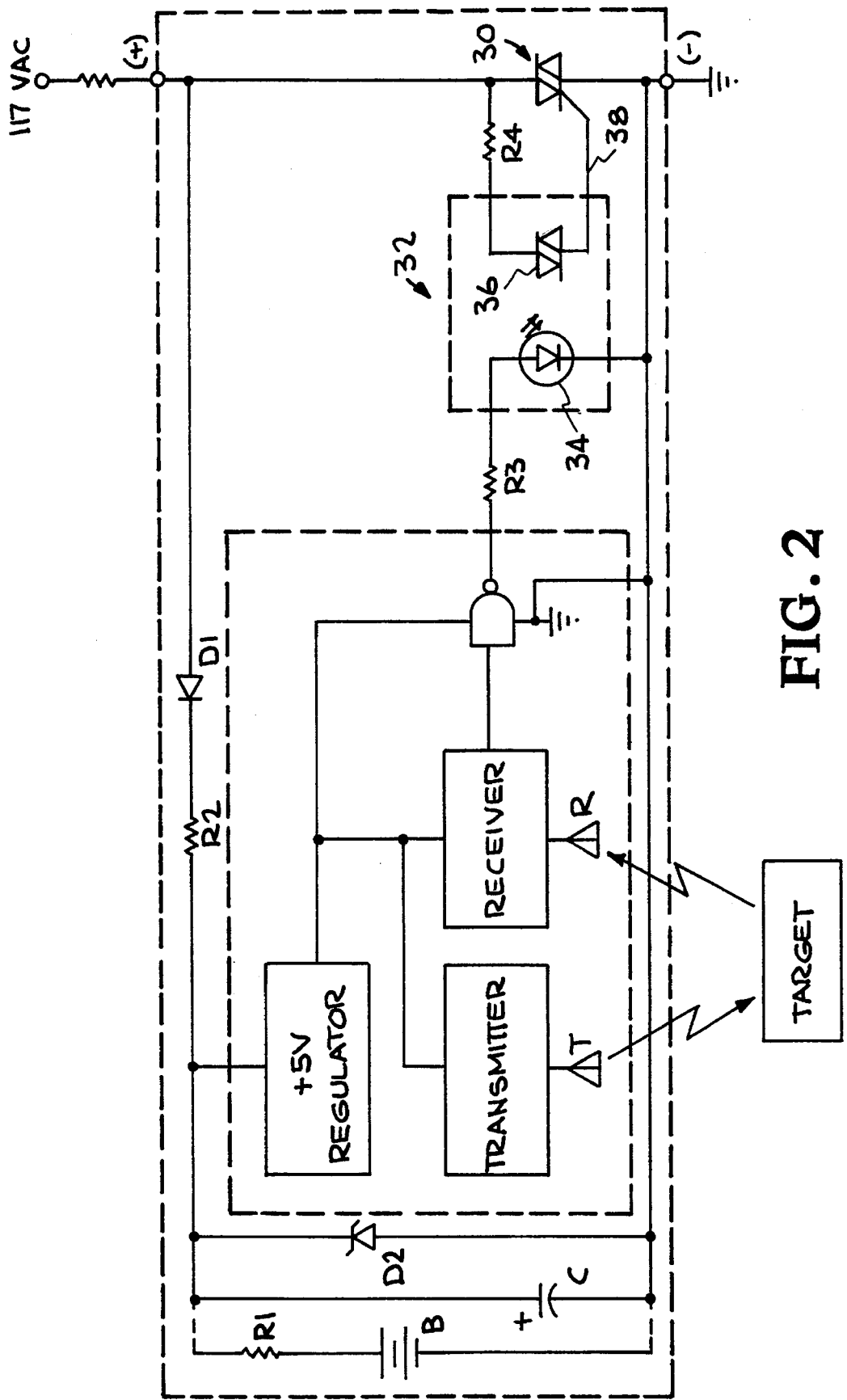
FIG. 2 is a schematic diagram of a two terminal micropower radar sensor with an AC power supply.

Although illustrated in FIG. 1 with a DC source, e.g. a 12.6 V car battery, the two terminal switch may also be used with an AC power source and load, as shown in FIG. 2. For an AC power source, e.g. 117 VAC household wiring, the MOSFET switching device is replaced with an AC compatible switching device 30 which can conduct in both directions, i.e. both positive and negative parts of the AC signal. A suitable AC switching device 30 is an optically controlled thyristor, e.g. Motorola MOC3012. As shown, thyristor 30 is driven by optically isolated TRIAC Driver 32 which includes an LED 34 and a second thyristor 36. Driver 32 is connected to the power source through resistor R4 and to control lead 38 of thyristor 30. If a thyristor with a sufficient current rating is available, only a single thyristor is necessary. Driver 32 is connected to the output of the radar motion sensor through limiting resistor R3 which limits current to LED 34. A current limiting resistor R2 is placed in series with diode D1 and a zener diode D2 is shunted across C or B to limit the rectified voltage on C or B to about 12 V DC. The remaining components of FIG. 2 are as in FIG. 1 and function similarly.

Figure 3:
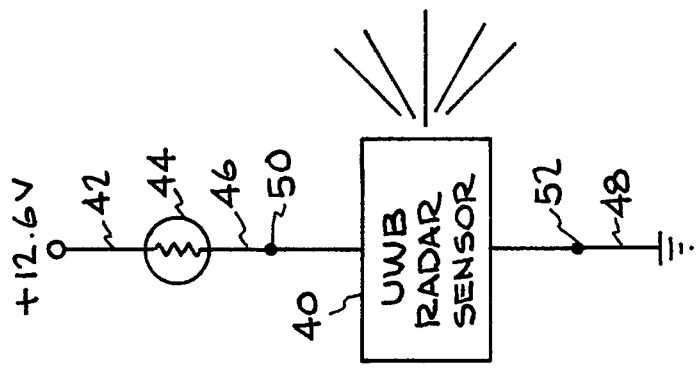
FIG. 3 is a simplified block diagram of the two terminal micropower radar sensor as a passive switch.

FIG. 3 depicts the simplified wiring to the active UWB radar sensor 40. A +6 V to +18 V DC power source, e.g., a 12.6 V automotive battery, or alternately an AC power source, is connected by wire 42 to load 44 which is connected by wire 46 to the power input of sensor 40 which is connected by wire 48 to ground. Thus sensor 40 is used as a simple switch with two terminals 50, 52. When the switch is open (no motion), almost no current flows through the load; when the switch is closed (motion), current flows through the load, producing an indicator signal. When the switch is open, the power source charges an energy storage device (capacitor or battery) in sensor 40. When the switch is closed, the energy storage device powers the sensor 40.

The sensor functions as a normally open SPST switch that operates from a single wire pair. Detected motion closes the switch and puts the sensor in a micropower mode that can hold the switch closed for greater than one hour in response to continuous motion detection (without external power).

Changes and modifications in the specifically described embodiments can be carried out without departing from the scope of the invention which is intended to limited only by the scope of the appended claims.

I claim:

1. A two terminal micropower ultra-wideband (UWB) radar motion sensor/switch apparatus, comprising:

a first terminal;

a second terminal;

a switch connected between the first terminal and the second terminal;

a diode having its anode connected to the first terminal;

a UWB radar motion sensor connected electrically in parallel with the switch and having its power input connected to the cathode of the diode, its signal output connected to the switch to control the switch, and a ground lead connected to the second terminal;

an energy storage means connected between the power input of the UWB radar motion sensor and the second terminal.

2. The apparatus of claim 1 further comprising a load connected to the first terminal, a power source connected to the load, and having the second terminal connected to ground.

3. The apparatus of claim 2 wherein the power source is a DC source.

4. The apparatus of claim 3 wherein the switch is a MOSFET.

5. The apparatus of claim 3 wherein the switch is a Darlington connected bipolar transistor.

6. The apparatus of claim 3 wherein the switch is a silicon controlled rectifier.

7. The apparatus of claim 2 wherein the power source is an AC source.

8. The apparatus of claim 7 wherein the switch is an optically controlled thyristor.

9. The apparatus of claim 8 further comprising a zener diode shunted across the energy storage means.

10. The apparatus of claim 2 wherein the load is a light or buzzer.

11. The apparatus of claim 1 wherein the energy storage means is a capacitor.

12. The apparatus of claim 11 wherein the capacitor is about 0.1 Farad.

13. The apparatus of claim 1 wherein the energy storage means is a rechargeable battery.

14. The apparatus of claim 13 further comprising a limiting resistor in series with the battery.

15. A two terminal micropower ultra-wideband (UWB) radar motion sensor/switch apparatus, comprising:

a first terminal;

a second terminal;

a MOSFET transistor having its drain connected to the first terminal and its source connected to the second terminal;

a diode having its anode connected to the first terminal;

a UWB radar motion sensor having its power input connected to the cathode of the diode, its signal output connected to the gate of the MOSFET transistor, and a ground lead connected to the second terminal;

an energy storage means connected between the power input of the UWB radar motion sensor and the second terminal.

16. The apparatus of claim 15 further comprising a load connected to the first terminal, a DC power source connected to the load, and having the second terminal connected to ground.

17. The apparatus of claim 15 wherein the energy storage means is a capacitor.

18. The apparatus of claim 17 wherein the capacitor is about 0.1 Farad.

19. The apparatus of claim 15 wherein the energy storage means is a rechargeable battery.

20. The apparatus of claim 19 further comprising a limiting resistor in series with the battery.

* * * * *